United States Patent

Borys et al.

Patent Number: 5,564,249
Date of Patent: Oct. 15, 1996

[54] AUTOMOTIVE TRIM PIECE

[76] Inventors: Tadeusz Borys, 148 Tree Grove Circle, Aurora, Ontario, Canada, L4G 6M1; Avi Zohar, 79 Mountbatten Road, Thornhill, Ontario, Canada, L4J 7W6; Albert Deleon, 14 Lafferty Street, Etobicoke, Ontario, Canada, M9C 5B6

[21] Appl. No.: 21,169

[22] Filed: Feb. 22, 1993

[51] Int. Cl.$^6$ .................................................. B60R 13/04
[52] U.S. Cl. .................. 52/716.5; 49/490.1; 52/716.8; 52/717.01; 52/717.04; 52/717.05; 296/146.2; 428/122
[58] Field of Search ................. 49/482.1, 490.1, 49/492.1; 52/717.01, 717.04, 717.05, 716.5, 716.8; 293/128; 296/146.2, 146.3; 428/31, 122

[56] References Cited

U.S. PATENT DOCUMENTS

| | | |
|---|---|---|
| 1,476,509 | 12/1923 | Hart . |
| 2,724,877 | 11/1955 | Ramsay ........................... 49/490.1 |
| 2,910,033 | 10/1959 | Weisburg . |
| 3,122,804 | 3/1964 | Stawinski . |
| 3,188,730 | 6/1965 | Meyer . |
| 3,359,030 | 12/1967 | Newman . |
| 3,388,523 | 6/1968 | Evans . |
| 3,506,294 | 4/1970 | Newman . |
| 3,606,432 | 9/1971 | Honatzis . |
| 3,606,433 | 9/1971 | Kunevicius . |
| 3,681,887 | 8/1972 | Loew . |
| 3,687,502 | 8/1972 | Loew . |
| 3,752,521 | 8/1973 | Lafebre . |
| 3,770,545 | 11/1973 | Jackson . |
| 3,777,438 | 12/1973 | Brown . |
| 3,780,152 | 12/1973 | Friesner . |
| 3,788,008 | 1/1974 | Yackiw et al. . |
| 3,817,016 | 6/1974 | Barényi . |
| 3,856,194 | 12/1974 | Helm . |
| 3,894,763 | 6/1975 | Barényi . |
| 3,934,385 | 1/1976 | Paulus et al. .................. 52/716.5 |
| 4,042,741 | 8/1977 | Bright . |
| 4,052,497 | 10/1977 | Monnet . |
| 4,066,285 | 1/1978 | Hall et al. . |
| 4,083,592 | 4/1978 | Rubin et al. . |
| 4,100,243 | 6/1978 | Wissinger et al. . |
| 4,183,778 | 1/1980 | Mesnel . |
| 4,220,365 | 9/1980 | Foster et al. . |
| 4,220,681 | 9/1980 | Narita . |
| 4,235,466 | 11/1980 | Mandrik . |
| 4,246,303 | 1/1981 | Townsend . |
| 4,298,640 | 11/1981 | Katoh ........................... 428/31 |
| 4,318,764 | 3/1982 | VanManen . |
| 4,352,772 | 10/1982 | Bezner . |
| 4,358,482 | 11/1982 | Jubelt . |
| 4,381,273 | 4/1983 | Azzola . |
| 4,411,941 | 10/1983 | Azzola . |
| 4,419,844 | 12/1983 | Kreisfeld . |
| 4,478,897 | 10/1984 | Akashi et al. . |
| 4,513,044 | 4/1985 | Shigeki et al. . |
| 4,535,024 | 8/1985 | Parker ........................ 428/31 X |
| 4,603,899 | 8/1986 | Iwasa ......................... 428/122 X |
| 4,617,209 | 10/1986 | Ives ........................... 293/128 X |

(List continued on next page.)

FOREIGN PATENT DOCUMENTS

| | | | |
|---|---|---|---|
| 0046002 | 2/1982 | European Pat. Off. . | |
| 482999 | 4/1992 | European Pat. Off. | ............ 296/146.2 |

Primary Examiner—Carl D. Friedman
Assistant Examiner—Kevin D. Wilkens
Attorney, Agent, or Firm—John C. Hunt

[57] ABSTRACT

A molding for installation on a vehicle which includes a decorative injection-molded polymeric skin secured to an outwardly facing portion of an elongate core and method of manufacture thereof. The skin extends along the length of the molding and includes a cap unitarily formed therewith at each end of the molding. Each cap is shaped to conceal the core when the molding is installed on the vehicle. The skin of the molding may be secured to the core by a heat activable adhesive. Alternatively, the molding includes an extruded first polymeric layer compatible with the polymeric skin between a first area of the outwardly facing portion of the core and the skin, the skin being directly bonded to the extruded polymeric layer and the extruded polymeric layer being adhesively bonded to the core.

13 Claims, 3 Drawing Sheets

U.S. PATENT DOCUMENTS

| | | |
|---|---|---|
| 4,619,847 | 10/1986 | Jackson . |
| 4,676,856 | 6/1987 | Shigeki et al. . |
| 4,708,351 | 11/1987 | Midooka et al. . |
| 4,709,525 | 12/1987 | Adell . |
| 4,778,550 | 10/1988 | Barton et al. . |
| 4,783,931 | 11/1988 | Kirkwood . |
| 4,800,699 | 1/1989 | Lang . |
| 4,861,530 | 8/1989 | Zaccaria . |
| 4,949,507 | 8/1990 | Vaughan ................................. 49/482.1 |
| 4,965,103 | 10/1990 | Roberts et al. . |
| 5,085,902 | 2/1992 | Yada et al. . |
| 5,143,772 | 9/1992 | Iwasa ..................................... 428/122 |
| 5,149,478 | 9/1992 | Malm . |
| 5,151,307 | 9/1992 | Jackson . |
| 5,182,141 | 1/1993 | Borys et al. . |
| 5,194,312 | 5/1993 | Verig .................................. 52/716.5 X |
| 5,207,027 | 5/1993 | Larsen ................................... 49/482.1 |
| 5,221,564 | 6/1993 | Keys .................................. 428/122 X |
| 5,240,751 | 8/1993 | Cakmakci ................................ 428/31 |
| 5,277,950 | 1/1994 | Zoller ..................................... 428/31 |
| 5,350,608 | 9/1994 | Zoller ..................................... 428/31 |

AUTOMOTIVE TRIM PIECE

FIELD OF THE INVENTION

This invention is in the field of moldings for installation on vehicles. In particular, this invention relates to a belt molding having a decorative plastic portion and unitarily formed plastic caps at the ends of the molding.

BACKGROUND TO THE INVENTION

There are many known molding products and methods of manufacture of such products.

U.S. Pat. No. 3,780,152 (Friesner) which issued Dec. 18, 1973, discloses a method and apparatus for producing a trim strip assembly. The trim strip has an extruded thermoplastic base member having a strip member with a metal-like appearance superimposed thereon and a transparent extruded plastic top coating.

U.S. Pat. No. 4,100,243 (Wissinger et al.) which issued Jul. 11, 1978, discloses a process for sizing an extruded thermoplastic structure formed by coextrusion of a core profile of one thermoplastic material and a cover layer of another thermoplastic material provided over a portion of the periphery of the core profile.

U.S. Pat. No. 4,183,778 (Mesnel) which issued Jan. 15, 1980, discloses a method for joining two extruded strips at a miter joint, where each strip includes a thermoplastic gripper portion glued to a thermosetting elastomer portion. The method involves the injection of a polyurethane thermoplastic resin into the joint between the thermoplastic portions and contemporaneous curing of the elastomeric portions.

U.S. Pat. No. 4,220,681 (Narita) which issued Sep. 2, 1980, discloses a trim piece for automobiles. A thin metal layer is integrally laminated on a plastic substrate and the metal layer is partially or wholly coated with a soft PVC resin.

U.S. Pat. No. 4,352,772 (Bezner) which issued Oct. 5, 1982, discloses a method and apparatus for injection-molding a plastic manifold onto tubular elements.

U.S. Pat. No. 4,478,897 (Akashi et al.) which issued Oct. 23, 1984, discloses a compound molding including a metal portion having polyvinyl chloride or the like extruded onto it. There is an intermediate extruded acrylonitrile butadiene styrene layer or the like between the metal portion and the polyvinyl chloride portion.

U.S. Pat. No. 4,861,530 (Zaccaria) which issued Aug. 29, 1989, discloses a method for sizing a weather strip as it is manufactured by omitting portions of extruded materials which then act as reference points for a cutting operation. A weather strip having a metal core surrounded by extruded elastomeric material is shown.

U.S. Pat. No. 4,965,103 (Roberts et al.) which issued Oct. 23, 1990, discloses a method and apparatus for extruding a molding strip having an outer polyurethane layer bonded to a central PVC layer is described. A reinforcing strip is embedded in the PVC portion.

U.S. Pat. No. 5,123,988 (Iwasa) which issued Jun. 23, 1992, discloses a process for obtaining a cloth finish on an extruded rubber article.

U.S. Pat. No. 5,151,307 (Jackson) which issued Sep. 29, 1992 describes a belt molding having "U"-shaped support member with a thermoplastic elastomer material such as Santoprene 3101-64 extruded onto a first portion and a thermoplastic material such as polyvinyl chloride extruded onto a second portion.

U.S. Pat. No. 5,182,141 (Borys et al.) which issued Jan. 26, 1993, describes an extruded trim piece having a metal substrate with a terpolymer of ethylene propylene diene monomer (EPDM) coating bonded to one area of the metal substrate and a polyvinyl chloride (PVC) coating bonded to another area of the metal substrate.

A number of other patent documents disclose vehicle moldings:

| Country & No. | Name | Date |
| --- | --- | --- |
| US 1,476,509 | Hart | December 4, 1923 |
| US 2,910,033 | Weisburg | October 27, 1959 |
| US 3,122,804 | Stawinski | March 3, 1964 |
| US 3,188,730 | Meyer | June 15, 1965 |
| US 3,606,433 | Kunevicius | Septemver 20, 1971 |
| US 3,681,887 | Loew | August 8, 1972 |
| US 3,687,502 | Loew | August 29, 1972 |
| US 3,770,545 | Jackson | November 6, 1973 |
| US 3,856,194 | Helm | December 24, 1974 |
| US 4,246,303 | Townsend | January 20, 1981 |
| US 4,800,699 | Lang | January 31, 1989 |

The foregoing documents thus describe a variety of molding products and methods and apparatuses for product manufacture, but do not address problems associated with providing the products with end members.

Automotive belt moldings are often required to be provided with end members. End members are aesthetically and functionally desirable. Moldings, at least as related to the present invention, have an elongate core longitudinal ends of which are desired not to be exposed once the molding is installed on a vehicle.

A belt molding is often hollow, having a central core with an interior cross-sectional profile that does not match the exterior profile of the portion of the vehicle to which it is attached. While a lower lengthwise edge of such a molding mounted on a car door abuts the door, there is a gap between the underside of the molding and the vehicle portion concealed by the molding. End portions are thus desirable to bridge the gap between the molding and vehicle part to which the molding is attached. This is aesthetically desirable and also provides a sealing function to preclude ingress of water. Further, end portions should be shaped to abut the vehicle so as to prevent snagging of clothing, etc. by the molding. A number of approaches has thus been taken to the provision of suitable end portions as part of vehicle moldings.

U.S. Pat. No. 4,358,482 (Jubelt) which issued Nov. 9, 1982, discloses a method for end finishing an elongated composite trim strip. The show surface of a strip is coated with a mask material and the strip is cut so that the mask material covers the show surface adjacent the cut end. The end is painted and the mask material cut away.

U.S. Pat. No. 4,619,847 (Jackson) which issued Oct. 28, 1986, discloses a trim strip having an injection molded finishing portion and a method for manufacture thereof. An elongate extruded trim strip has ends modified by cutters and each end is loaded into an injection molding die. Thermoplastic material is injection molded onto each modified end. According to this approach, a molding having a seam at each end, at the interface of the strip and injection molded portion, is obtained. Further, it is difficult to match the finish of the plastic trim strip, if it is extruded, and the plastic of the injection-molded portion.

U.S. Pat. No. 5,085,902 (Yada et al.) which issued Feb. 4, 1992, provides a possible solution to the problem of unsightly seams. In one disclosed embodiment a metal core has a film laminated onto it. The resultant product is roll-formed to the desired profile and longitudinal PVC edges are extruded onto the core. The material is cut into strips and each end of the strip has portions cut away to form notches. A portion of each end is folded into place and PVC end portions are injection molded onto each end. This approach is relatively complicated in that it requires cutting and bending into place portions of each end of the strip. Further, it does not fully address the problem of seams. There is still a seam between extruded and injection molded portions and between laminate portion and extruded portions. Presumably there is also a joint formed in corner areas at each corner where the bent portion of the extruded strip meets the remaining extruded portion.

U.S. Pat. No. 4,318,764 (VanManen) which issued Mar. 9, 1982, discloses a method of extrusion and injection molding of a trimmed product. This document describes a trim piece having an extruded trim strip onto which is formed an injection molded part. The extruded trim strip includes a decorative trim strip pressed onto an extruded (transparent) base. The strip is bent and placed in a mold and a support shell is injected molded onto its reverse face. The strip is flexible and is bent to match the shape of the end portions of the extruded support. The strip thus provides a decorative portion to an injection molded support.

Other approaches to furnishing moldings with end pieces are described in the following documents:

| Country & No. | Name | Date |
| --- | --- | --- |
| US 3,359,030 | Newman | December 19, 1967 |
| US 3,388,523 | Evans | June 18, 1968 |
| US 3,506,294 | Newman | April 14, 1970 |
| US 3,606,432 | Honatzis | September 20, 1971 |
| US 3,752,521 | Lafebre | August 14, 1973 |
| US 3,777,438 | Brown | December 11, 1973 |
| US 3,817,016 | Barényi | June 18, 1974 |
| US 3,894,763 | Barényi | July 15, 1975 |
| US 4,066,285 | Hall et al. | January 3, 1978 |
| US 4,220,365 | Foster et al. | September 2, 1980 |
| US 4,235,466 | Mandrik | November 25, 1980 |
| US 4,709,525 | Adell | December 1, 1987 |

SUMMARY OF THE INVENTION

The present invention provides a molding for installation on a vehicle which includes a decorative injection-molded polymeric skin secured to an outwardly facing portion of an elongate core. The skin extends along the length of the molding and includes a cap unitarily formed therewith at each end of the molding. Each cap is shaped to conceal the core when the molding is installed on the vehicle.

The skin of the molding may be secured to the core by a heat activable adhesive.

Alternatively, as described further below in connection with a preferred embodiment, a molding of the present invention includes an extruded first polymeric layer compatible with the polymeric skin between a first area of the outwardly facing portion of the core and the skin, the skin being directly bonded to the extruded polymeric layer. It is generally preferable that such an extruded polymeric layer be adhesively bonded to the core.

In illustrated embodiments, the extruded polymeric layer and the polymeric skin are each of polyvinyl chloride, but the extruded polymeric layer and the polymeric skin may together be selected from the group of: thermoplastics including polypropylene; modified polypropylene; and thermoplastic elastomeric materials.

The illustrated embodiments of the molding further comprise a second polymeric layer secured directly to a second area of the core, which second polymeric layer may be selected from the group of: ethylene propylene diene monomer and thermoplastic elastomeric materials.

The molding may be tapered from one of its ends to the other or it may be of constant cross-section along its length.

In particular embodiments, the core of the molding of the present invention has a "U"-shaped cross-section so as to have first and second legs for installation along an upper portion of a door panel of the vehicle. The first leg may include the outwardly facing portion of the core and/or the second leg may have the extruded second polymeric layer chemically adhered thereto.

Most preferably, the injection-molded skin and end caps of the molding are seamless.

In another aspect the present invention includes a method of making a belt molding for installation on a vehicle. The method includes steps of forming an elongate core to a predetermined configuration and cutting the core to a predetermined length. Another step includes securing a decorative polymeric skin along the length of the core including injection molding the skin and a cap therefor at each end of the molding onto the core unitarily, that is, in a single molding step.

The method may further include the step of extruding a layer of polymeric material compatible with the polymeric skin onto a first area of the core prior to the cutting step and the securing step may thus include injection molding the skin directly onto the polymeric layer. Such a method may also include the step of applying an adhesive to the first area of the core for bonding the polymeric material to the core prior to the extruding step.

Methods according to the present invention may also include the step of securing a polymer to a second area of the core prior to the cutting step.

In a particular embodiment, the present invention includes a method of manufacturing a belt molding for installation on a vehicle in which the method includes the steps of forming an elongate metal core to a predetermined cross-section followed by extruding a thermosetting layer along the length of the core and securing the layer to a first area of the core. The method includes subsequently curing the thermosetting layer and extruding a thermoplastic layer along the length of the core and securing the thermoplastic layer to a second area of the core. This particular method also includes securing flock along an area of the thermosetting layer to present a low friction surface and subsequently cutting the core to obtain a piece of suitable length and trimming away selected portions of the piece to match the vehicle on which the molding is to be installed. The method also includes injection molding a skin along the length of the piece including a unitarily molded cap at each of its ends to conceal the core when the molding is installed on the vehicle.

DETAILED DESCRIPTION OF PREFERRED EMBODIMENTS

Figure 1:
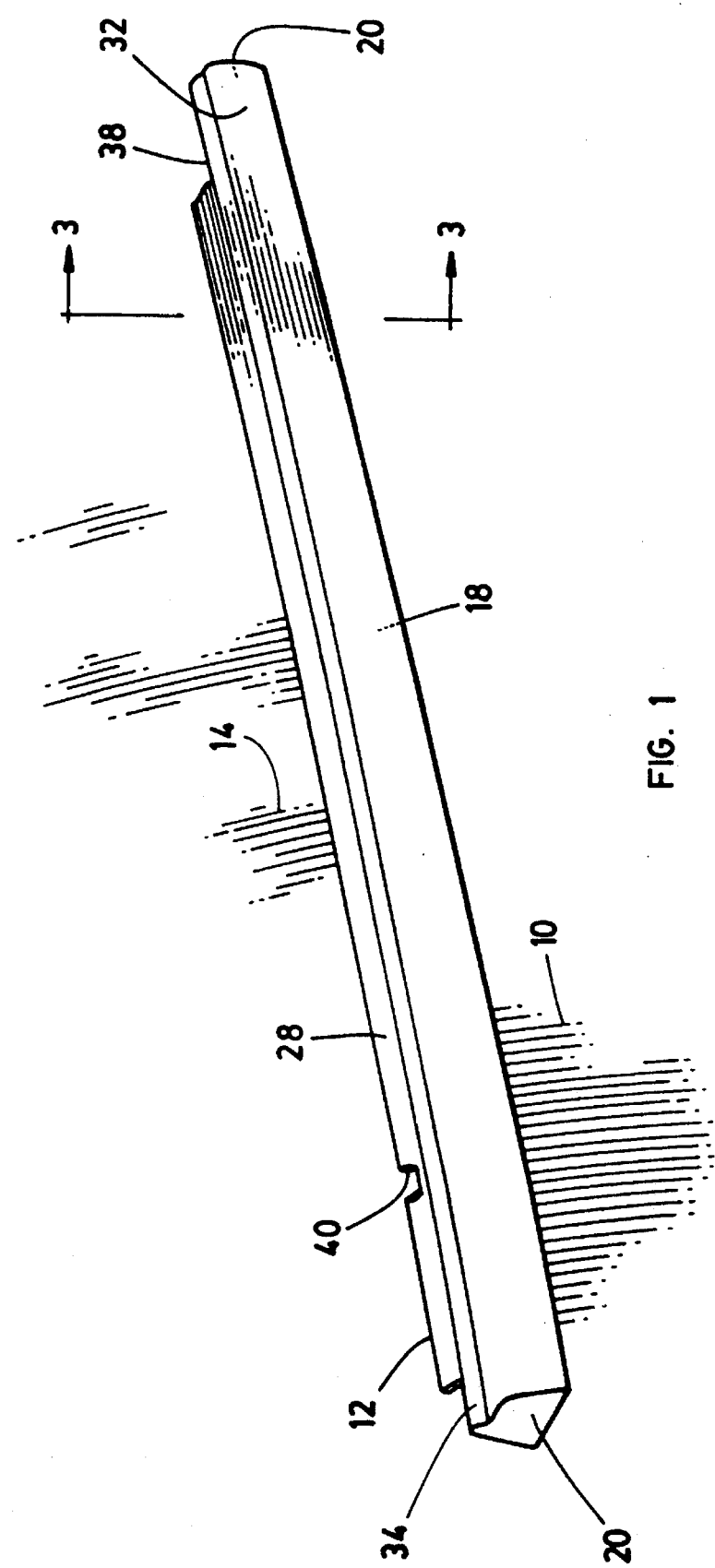
FIG. 1 shows a first preferred embodiment belt molding installed on a driver's side door of an automobile door.
Figure 3:
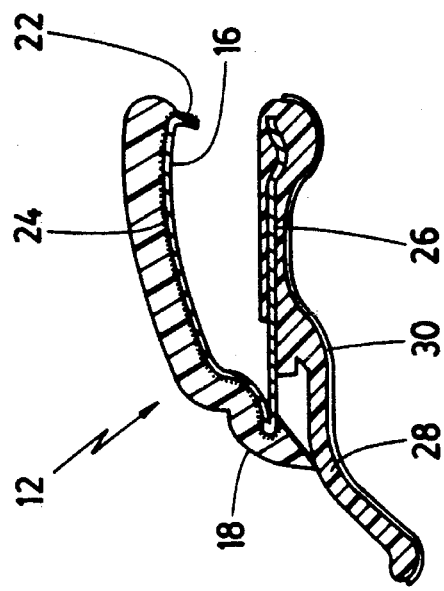
FIG. 3 shows a cross-sectional view of the FIG. 1 embodiment taken along 3—3 of FIG. 1.
Figure 2:
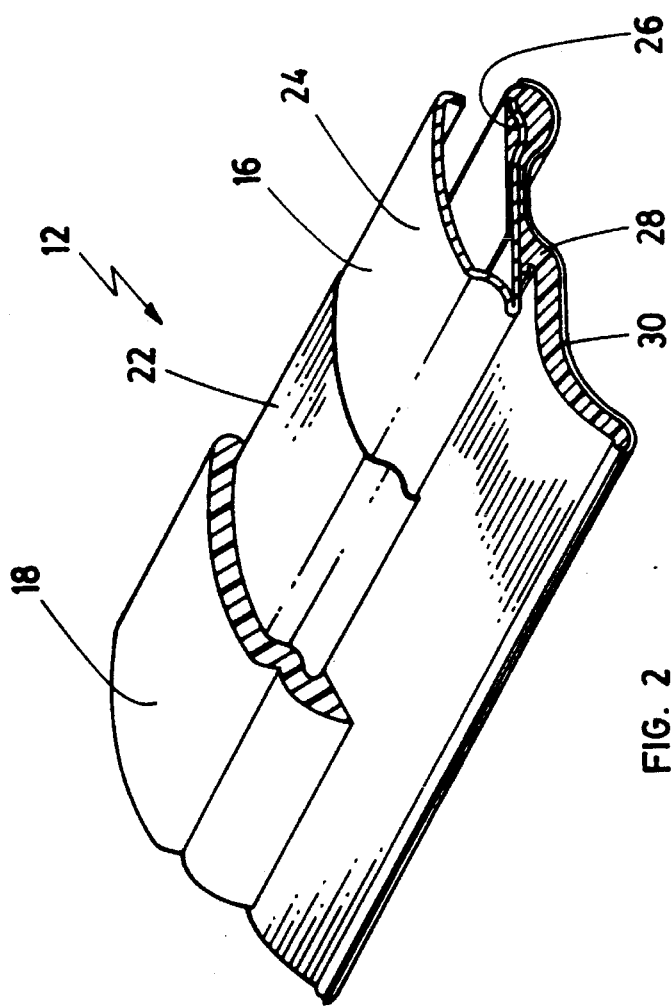
FIG. 2 is an isometric view of a portion of the FIG. 1 molding, layered portions being removed for illustrative purposes.
Figure 4:
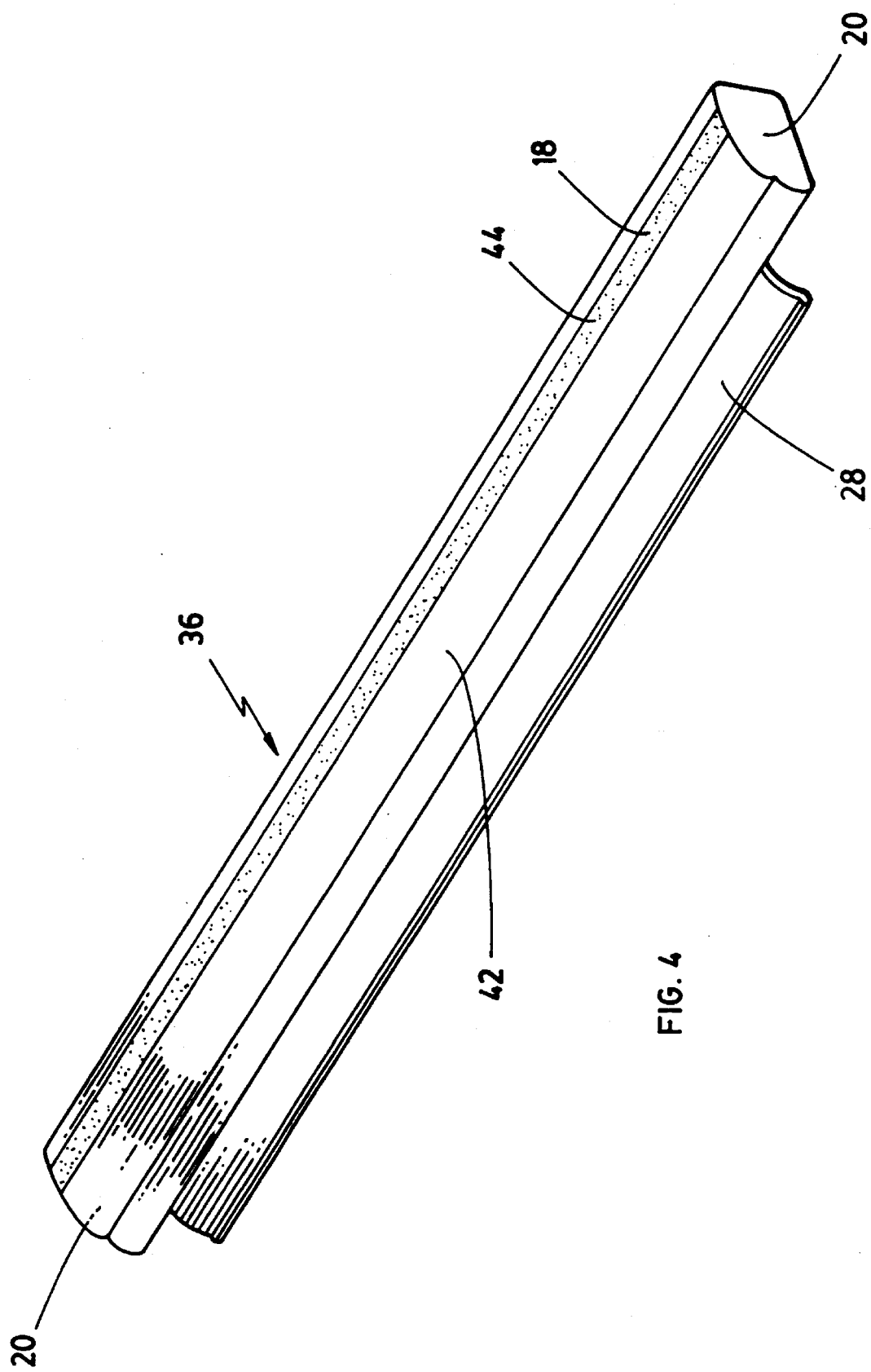
FIG. 4 is an isometric view of a second preferred embodiment untapered molding.

Turning to the drawings, FIG. 1 shows an upper part of car door panel 10 having first embodiment belt molding 12 installed along the top of the panel to abut window glass 14.

Belt molding 12 includes roll-formed aluminum strip 16 having a generally "U"-shaped cross-section, which strip provides a relatively rigid core for plastic portions of the molding. Extending from one end to the other of the molding is injection-molded thermoplastic skin 18. Formed unitarily with the skin are end caps 20. The end caps and skin are injection molded at the same time in the same mold from the same material and in this way are unitarily molded with each other. Further, the skin and caps of the preferred embodiment are molded so as to be seamless, there being no seams between the end caps and central portion of the strip visible once the molding is installed on a vehicle.

The preferred embodiments described herein each include an extruded polyvinyl chloride layer (PVC) 22 adhesively bonded to a portion of the outwardly convex surface of outer leg 24 of installed strip 16. Injection molded skin 18, being "compatible" with the underlying extruded portion bonds directly to the extruded PVC layer without the need for adhesive during the injection molding process. The inner leg 26 of the strip has extruded onto it ethylene propylene diene monomer (EPDM) layer 28 having flocking 30 which abuts the window glass. As best seen in FIG. 1, first embodiment molding 12 is tapered, being of narrower cross-section at forward end 32 than at rearward end 34. Second embodiment molding 36 is similar to the first embodiment molding, but it is not tapered along its length. The metal core of molding 36 is of constant cross-section along its length from one end to the other.

Skin 18 and end caps 20 may alternatively be of modified polypropylene, a blend of EPDM and polypropylene. It may also be desirable for the extruded thermoplastic portion to be extruded onto a portion of the extruded EPDM portion in addition to the metal core. Further, the injection-molded thermoplastic portion may also be molded onto an EPDM portion as well as to the metal or extruded thermoplastic portion as desired.

In a preferred process of manufacture according to this invention, an aluminum substrate is cleaned, in preparation for application of the adhesive to be used to bond an EPDM layer thereto as follows. After rollforming, the formed aluminum strip is passed through an enclosed cleaning tank where it is sprayed with warm alkaline solution. Typically, the solution has a pH of about 10 to 12 and a temperature of about 60° C., the conditions being sufficient to condition the metal for adhesion of later applied adhesives and coatings. The strip is next passed through a second rinse tank wherein it is sprayed with water in order to remove the alkaline cleaning solution. The metal is then dried with a hot air blast at about 90° C. to 100° C.

To a first area of the cleaned substrate was applied an EPDM primer suitable for bonding EPDM to aluminum, "Chemlok 205" (trademark), a metal primer including a combination of phenolics and chlorinated rubber available from Lord Corporation. This was heated to give a surface temperature of about 120° C., the primer thereby being ready for application of adhesive.

To the primed area was applied an EPDM adhesive suitable for bonding EPDM to the primer, "Chemlok 250" (trademark), a heat-activable polyisocyanate based adhesive also available from the Lord Corporation. This was heated to give a surface temperature of about 120° C., the adhesive thereby being activated and ready for application of EPDM.

EPDM, available as Thona E3402D was then extruded in molten form onto the metal substrate so as to apply the EPDM to the area of the substrate covered by the adhesive.

To a second area of the substrate was applied a PVC adhesive known as A1617B, a pigmented, modified acrylic adhesive available from B. F. Goodrich, for bonding PVC to aluminum. This adhesive has the properties of bonding PVC to the aluminum substrate and being heat activated under conditions, as described below, suitable for curing the EPDM previously applied to the substrate. An alternative adhesive is Sternson Adhesives PR1029 which is also a heat-activable adhesive, although the activation temperature is a few degrees higher.

The piece was then passed through an oven at 210° C. to provide a residence time of about 6 minutes wherein the EPDM was cured and the PVC adhesive was activated.

Upon exit from the oven, PVC was extruded in molten form onto the substrate so as to apply the PVC to the area of the substrate to which the PVC adhesive was applied.

Flock adhesive known as "Flocklok 852" (trademark) with catalyst "Chemglaze 9988" (trademark) was applied to the desired region of the EPDM as known to those skilled in the art, and the flock adhesive cured at about 190° C., this taking about four minutes. Flock, a material which presents a low friction surface to a glass window which it abuts, is then applied.

The aluminum core with extruded layers secured thereto is then cut to length. For first embodiment molding 12, the core is then crimped to obtain the desired degree of taper. Metal and polymeric portions are then trimmed away as can be seen in FIG. 1 to obtain trimmed portions 38, 40 to match the portion of the vehicle to which the molding is to be attached. The polyvinyl chloride skin is then injection-molded onto extruded PVC layer 22.

The EPDM must be cured before extrusion of PVC onto the substrate since the conditions necessary for curing the EPDM are too harsh for the PVC and would damage the PVC, as for example, by causing the PVC to melt slightly and lose its intended final shape.

The starting metal substrate used in the preferred process illustrated is an aluminum strip or ribbon. Such a substrate of stainless steel or of galvanized steel or of zinc would work equally well in the illustrated example, but cleaning should be preceded by roughening. It would also be possible to similarly roughen the aluminum substrate used in the above example, although a satisfactory product was produced without the application of a roughener.

The above example of a method of producing a product made in accordance with this invention is intended to be illustrative. It is known that shorter evaporation and curing times for adhesives and EPDM may be achieved at higher temperatures. A typical temperature for activating the EPDM adhesive is between about 110° C. and 140° C. A typical temperature for curing the EPDM is between about 200° C. and 260° C. A flock adhesive curing temperature between 150° C. and 220° C. may be used. In situations such as the preferred embodiment of this invention wherein flock adhesive is applied to EPDM after the metal has been coated with PVC, this curing temperature should be kept low enough so as not to melt the PVC or spoil its finish through overheating. For example, a temperature above about 220° C. with a residence time of 2 minutes would be considered excessive.

The disclosed molding 12 thus includes skin 18 and end caps 20 unitarily molded with each other and presenting no visible seams once the molding is installed on a vehicle. Because the skin and caps are unitarily molded, there is no difficulty in matching the gloss or the colors of the skin and cap portions. It will further be appreciated that the finish obtainable with injection-molded PVC is of a higher gloss than that obtainable with extruded PVC. In instances in which the underlying extruded PVC layer is to be covered by the injection-molded skin and end caps so as not to be visible when installed on a vehicle, the underlying PVC layer can be of a lower grade, since its appearance is not important in the finished molding. Further, it is possible, while avoiding parting lines between the injection-molded skin and end caps to have a portion of the underlying extruded portion exposed such that the visible plastic portion of the molding presents two colors or surfaces having two gloss levels. Further, it is possible to carry out the injection molding in two steps to obtain a molding with two colored surfaces visible or surfaces having different gloss levels. In such case seams between the end caps and skin are still avoided, there being a line necessary at the interface of the differently colored or differently glossed surfaces. Alternatively, a skin having one visible region 42 of a first given texture, say a relatively smooth shiny surface presenting a relatively high gloss and another region 44 presenting a second texture, say of a rough or dull, that is, relatively low gloss surface is obtainable. As known to persons skilled in the art, the texture of the interior surface of the mold against which the skin is formed may be obtained, such as by machining, so as to yield such effects in the molded product, as desired.

In the disclosed embodiment, the PVC extruded skin is about 0.01 inches thick, the PVC injection-molded portion is about 0.06 inches thick at its center and the aluminum core is about 0.02 inches in thickness.

It will also be noted that there is no need for mechanical fastening of the injection-molded end caps to the core when the end caps and skin extending the along the length of the molding, as in the disclosed embodiments, are unitarily formed with each other. Further no modification of the extruded strip is required after it is cut to the desired length for injection-molding of the skin and end caps thereonto, although crimping may be preferred, as in the case of the first disclosed embodiment and trimming is often necessary, as described.

Adhesives are often required to be used in fastening organic polymeric materials to metal supports in order to meet "peel test" requirements of the automotive industry. A further advantage of the approach taken for the preferred embodiment stems from an extruded plastic layer intermediate the metal support and injection-molded finishing layer. Each of the preferred embodiments requires application of an adhesive in an in-line extrusion process to a support core, followed directly by extrusion of a polymer thereto to secure the polymer to the core. This intermediate product is then further modified, including steps involving trimming of the core and EPDM layers. The final plastic layer is then injection-molded onto the part without the requirement of an additional adhesive. Because the injection-molded portion and underlying extruded portion to which it is applied are compatible, sufficient bonding strength is provided between these two layers so as to avoid the requirement for application of adhesive for fastening the injection-molded portion. The bond between the two compatible layers is believed to result from a sufficient melting together of the layers during the injection-molding step. In any case, avoidance of a step involving adhesive application is particularly advantageous here because application of the adhesive, for practical purposes would have to be accomplished after the modification steps and such application to a cut piece is inconvenient relative to the in-line application of same during a more or less continuous extrusion process. While it is appreciated that there are advantages, as described above, to the presence of an extruded polymeric layer between the core and injection-molded portion, it is possible to injection-mold directly onto a metal core treated with a suitable adhesive, a skin and end caps unitarily molded with each other. Preferably, a heat-activable adhesive that would be sufficiently activated by the heat generated during the injection molding process would be used, thus avoiding the requirement of a separate heating step to activate the adhesive.

Substitutions of materials may thus be made in the preferred embodiments as follows: a thermoplastic elastomer (TPE) could be extruded and injection-molded in place of corresponding PVC portions; similarly, polypropylene could be substituted for PVC; alternatively, polypropylene could be substituted for PVC and the EPDM layer could be substituted for by a TPE; all three portions could be a TPE; or PVC could be applied and secured as described and a TPE substituted in place of the EPDM portion. Other combinations are obtainable by persons skilled in the art.

It is to be understood that the disclosed examples of the invention are illustrative and that the scope of the invention is defined by the appended claims.

What is claimed is:

1. A molding for installation on a vehicle, comprising:
    an elongate core having an outwardly facing portion and an inwardly facing portion when installed on the vehicle;
    a decorative injection-molded thermoplastic polymeric skin secured to the outwardly facing portion of the core along the length of the molding, the skin having a cap unitarily formed therewith at each end of the molding, each cap shaped to conceal the core when the molding is installed on the vehicle;
    an extruded first polymeric layer compatible with the polymeric skin adhesively bonded to a first area of the outwardly facing portion of the core, the skin being directly bonded to the extruded polymeric layer; and
    a second polymeric layer secured directly to a second area of the core, the second polymeric layer selected from the group of ethylene propylene diene monomer and thermoplastic elastomeric materials.

2. The molding of claim 1 wherein the extruded polymeric layer and the polymeric skin are each of polyvinyl chloride.

3. The molding of claim 2 wherein the core is tapered from one of the ends thereof to the other.

4. The molding of claim 2 wherein the core is of constant cross-section along its length.

5. The molding of claim 2 wherein the core has a "U"-shaped cross-section having first and second legs for installation along an upper portion of a door panel of the vehicle.

6. The molding of claim 1 wherein the extruded polymeric layer and the polymeric skin are together selected from the group of: thermoplastics including polypropylene; modified polypropylene; and thermoplastic elastomeric materials.

7. The molding of claim 1 wherein the injection-molded skin and end caps are seamless.

8. The molding of claim 1 wherein the core is of roll-formed metal.

9. The molding of claim 1 wherein a first visible region of the skin presents a relatively high gloss appearance and a second visible region of the skin presents a relatively low gloss appearance.

10. A molding for installation on a vehicle, comprising:

an elongate core of "U"-shaped cross-section and having first and second legs for installation along an upper portion of a door panel of the vehicle and an outwardly facing portion of the core and an inwardly facing portion of the core when installed on the vehicle, the first leg including the outwardly facing portion of the core and the second leg having an extruded layer of a first polymeric layer chemically adhered thereto;

a decorative injection-molded thermoplastic polymeric skin of polyvinyl chloride secured to the outwardly facing portion of the core along the length of the molding, the skin having a cap unitarily formed therewith at each end of the molding, each cap shaped to conceal the core when the molding is installed on the vehicle; and an extruded second polymeric layer of polyvinyl chloride compatible with the polymeric skin adhesively bonded to a first area of the outwardly facing portion of the core, the skin being directly bonded to the extruded polymeric layer.

11. A molding for installation on a vehicle, comprising:

an elongate core of "U"-shaped cross-section and having first and second legs for installation along an upper portion of a door panel of the vehicle and an outwardly facing portion of the core and an inwardly facing portion of the core when installed on the vehicle, the first leg including the outwardly facing portion of the core and the second leg having an extruded layer of a thermosetting polymer chemically bonded thereto;

a decorative injection-molded thermoplastic polymeric skin of polyvinyl chloride secured to the outwardly facing portion of the core along the length of the molding, the skin having a cap unitarily formed therewith at each end of the molding, each cap shaped to conceal the core when the molding is installed on the vehicle; and an extruded first polymeric layer of polyvinyl chloride compatible with the polymeric skin adhesively bonded to a first area of the outwardly facing portion of the core, the skin being directly bonded to the extruded polymeric layer.

12. The molding of claim 11 wherein the thermosetting polymer comprises ethylene propylene diene monomer and the molding further comprises a flocking layer bonded to the thermosetting polymer for abutment of a window of the vehicle when installed thereon.

13. The molding of claim 11 wherein the core is of roll-formed metal and the first leg has an outwardly convex cross-section.

* * * * *